(12) United States Patent
De Groot

(10) Patent No.: US 6,762,652 B2
(45) Date of Patent: Jul. 13, 2004

(54) OSCILLATING CIRCUIT, CONVERTER WITH SUCH OSCILLATING CIRCUIT, AND PRECONDITIONER WITH SUCH CONVERTER

(75) Inventor: Humphry Rene De Groot, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 4 days.

(21) Appl. No.: 10/192,264

(22) Filed: Jul. 10, 2002

(65) Prior Publication Data

US 2003/0071690 A1 Apr. 17, 2003

(30) Foreign Application Priority Data

Jul. 20, 2001 (EP) .............................................. 01202788

(51) Int. Cl.⁷ .............................. H03B 5/00; G05F 1/70
(52) U.S. Cl. .......................... 331/185; 331/184; 363/89; 323/205
(58) Field of Search ................................. 331/185, 184, 331/187; 323/222, 282, 266, 281, 210, 285; 363/89, 90, 124

(56) References Cited

U.S. PATENT DOCUMENTS

| | | | | |
|---|---|---|---|---|
| 5,515,261 A | * | 5/1996 | Bogdan | 363/89 |
| 5,568,041 A | * | 10/1996 | Hesterman | 323/207 |
| 5,615,098 A | | 3/1997 | Ishii et al. | 363/84 |
| 5,644,214 A | * | 7/1997 | Lee | 323/211 |
| 5,726,871 A | * | 3/1998 | Choi | 363/89 |
| 6,476,588 B2 | | 11/2002 | Frohler | 323/222 |
| 6,504,315 B2 | * | 1/2003 | Kim | 315/224 |

* cited by examiner

*Primary Examiner*—Minh Nguyen

(57) ABSTRACT

An oscillator for use in a preconditioner includes a rectifier, a converter receiving an input voltage and supplying an output voltage, and a control unit effecting peak current mode control. The oscillator has a switching frequency with a period dependent on the input voltage and the output voltage.

4 Claims, 5 Drawing Sheets

US 6,762,652 B2

OSCILLATING CIRCUIT, CONVERTER WITH SUCH OSCILLATING CIRCUIT, AND PRECONDITIONER WITH SUCH CONVERTER

FIELD OF TECHNOLOGY

The present invention relates to an oscillator for use in a preconditioner comprising a rectifier (1), a converter (2) receiving an input voltage ($U_{in}$) and supplying an output voltage ($U_{out}$), and a control unit (3) for controlling the peak current mode to maintain a constant output voltage. The invention also relates to a voltage converter provided with such an oscillator, and a preconditioner with such an oscillator.

BACKGROUND AD SUMMARY

A simple way to rectify an AC source to a DC output is to use a diode bridge rectifier and a capacitor. However, when the input power is greater than 75 W, this is not allowed according to the requirements of IEC1000-3-2.

Alternatively, a Switch Mode Power Supply (SMPS) can be used, comprising e.g. a diode bridge rectifier and a boost converter, to control the current drawn from the mains. Although it is possible to draw a sine-shaped current from the mains (e.g. using a Power Factor Control (PFC)), square wave current or a trapezoid-shaped current may also be used, at least under certain power levels. An advantage of using a square wave input current is that the peak value is 1.27 lower than a sine-shaped current for the same output power. A lower peak level means that a smaller inductive component (coil) can be used, reducing cost and space requirements.

An example of a rectifier in combination with a boost converter drawing a trapezoid input current is given in U.S. Pat. No. 5,615,098, where the main object is to obtain a simpler control electronics. However, this converter operates in the continuous mode. Boost converters operating in the discontinuous mode are also well known in the art. In such converters, during every switching period, the current in the boost coil reaches a certain maximum and at the end is zero again (triangle form). Such converters have smaller coils compared to continuous mode converters, lower turn-on losses and emission levels due to the zero current at switching, and control of output is simpler.

An object of the present invention is to provide improved frequency control for a power converter operating in the discontinuous mode with peak current mode control.

A second object of the invention is to reduce the required size of the boost coil in a boost converter.

A third object of the invention is to provide a converter drawing a square wave or trapezoid-shaped input current.

According to a first aspect of the invention, these and other objects are accomplished by an oscillator of the type mentioned by way of introduction, having the features described in the independent claim 1.

This inventive switching frequency control scheme makes it possible to provide a converter operating in the discontinuous mode that draws a square wave input current. An important detail of this aspect of the invention is that both input and output voltages are allowed to influence the switching frequency. The function of the switching period ($T_{per}$) in accordance with the invention enables a better control of the input current supplied to the converter and, in particular, an essentially constant average input current to be obtained.

According to another aspect of the invention, the above switching period is realized substantially by an oscillator of the type mentioned by way of introduction, having an output signal dependent upon the voltage across a timing capacitor, and comprising a switching element arranged to connect the capacitor to ground when said output signal is low, thereby causing discharging of said capacitor during a discharge time. The oscillator further comprises a zener diode and a transistor, connected to the input voltage in such a way that, when the input voltage exceeds the zener voltage of the zener diode, a current flows through the transistor, thereby decreasing the discharge current and increasing the discharge time.

In this oscillator, the discharge current is divided into two regions, depending on whether the input voltage is lower or higher than the zener voltage.

This circuit can be realized by connecting the transistor emitter to the input voltage via a resistance, connecting the transistor collector to the anode of a diode, the cathode of which is connected to the capacitor, and connecting the transistor base to the cathode of the zener diode, the anode of which is connected to ground.

According to a preferred embodiment, a second zener diode, connected to the input voltage in such a way that, when the input voltage exceeds a voltage limit, equal to the sum of the zener voltage of the first zener diode and a function of the zener voltage of the second zener diode, the current through the transistor increases, thereby further decreasing the discharge current and increasing the discharge time.

The discharge current is now divided into three regions, (1) below the first zener voltage, (2) between the zener voltage and the voltage limit, and (3) above the voltage limit.

This circuit can be realized by connecting the cathode of the second zener diode to the input voltage via a resistance, and connecting the anode of the second zener diode to the cathode of the first zener diode and to the base of the transistor.

The oscillator preferably comprises a second switching element arranged to connect the collector of the transistor to ground when said output signal is high.

Other aspects of the invention include a converter and a preconditioner comprising such an oscillator.

BRIEF DESCRIPTION OF THE DRAWING FIGURES

These and other aspects of the invention will be apparent from the preferred embodiments more clearly described with reference to the appended drawings.

DETAILED DESCRIPTION

Figure 1:
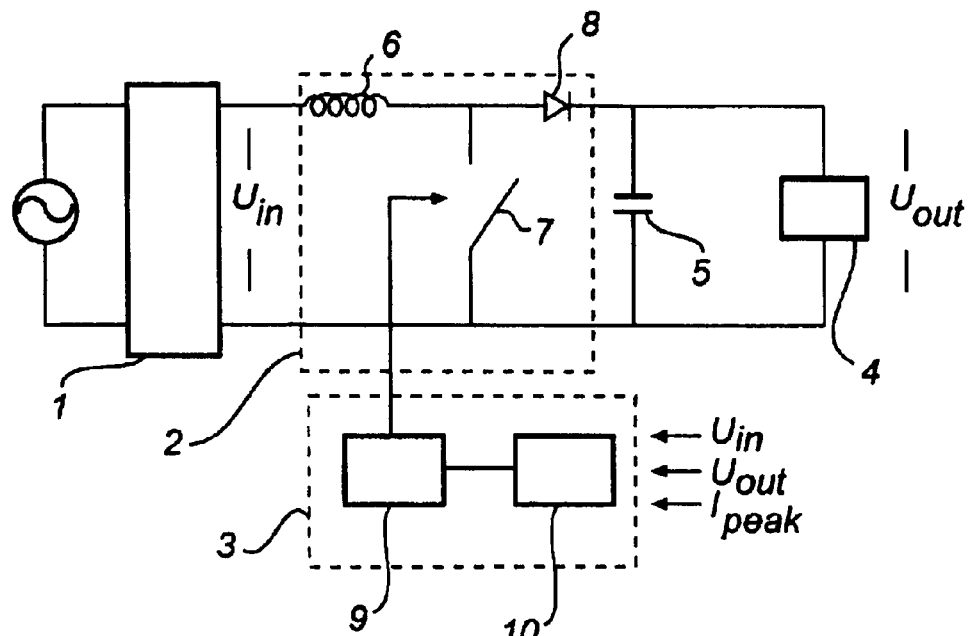
FIG. 1 is a schematic view of a preconditioner according to an embodiment of the invention.

FIG. 1 shows a schematic view of a preconditioner comprising a full-wave rectifier 1, a boost converter 2, and a control unit 3. The rectifier 1 supplies an input voltage $U_{in}$ to the boost converter 2, and the output voltage from the boost converter, $U_{out}$, is supplied to a load 4 arranged in parallel with a smoothing capacitor 5. The boost converter 2 includes a boost coil 6, a switching element 7 and a diode 8. The control unit 3 includes a pulse width modulator (PWM) 9 for controlling the peak current mode of the boost converter input current, and an oscillator circuit providing a switching frequency to the PWM 9. The oscillator circuit is provided with the boost converter input voltage $U_{in}$ and output voltage $U_{out}$, respectively.

According to the working principle of this preconditioner, the control unit 3 controls the switching element 7 of the boost converter, thereby causing a positive or negative voltage across the boost coil 6, in order to control the peak current in the coil, $I_{peak}$. The pulse width modulator 9 is provided with a switching frequency from the oscillator circuit 10, and the present invention relates to determining this oscillating frequency in an optimal way.

Figure 2:
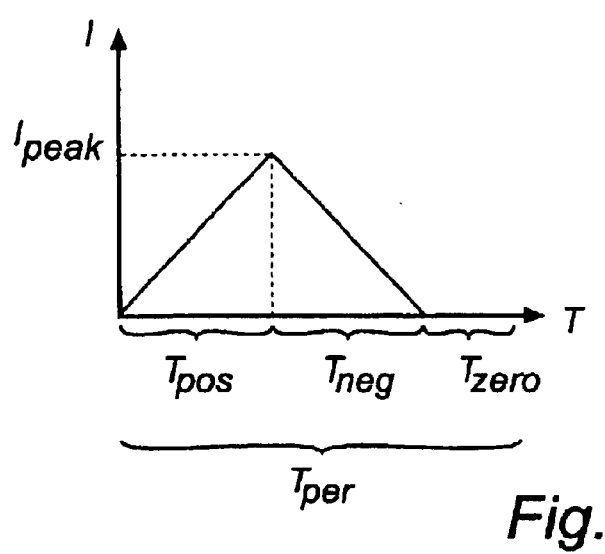
FIG. 2 shows the current through the coil in the circuit in FIG. 1.

FIG. 2 is a diagram showing the variation of the current through the boost coil 6. If $I_{peak}$ is the peak current, then the time of positive voltage and increasing current across the coil can be given by the equation:

$$T_{poistivee} = \frac{I_{peak} L_1}{U_{in}}, \tag{1}$$

where $U_{in}$ is the input voltage from the rectifier 1 and $L_1$ is the inductance of the boost-coil.

The time of negative voltage and decreasing current across the same coil can be expressed by the equation:

$$T_{negative} = \frac{I_{peak} L_1}{U_{out} - U_{in}}, \tag{2}$$

where $U_{out}$ is the output voltage from the boost converter.

After $T_{positive}$ and $T_{negative}$ the current through the boost coil 6 is zero, and may remain zero for a certain period of time, $T_{zero}$, before a positive voltage is applied again across the coil and the current start to increase again. The total period of one cycle is thus $$T_{per} = T_{positive} + T_{negative} + T_{zero}.$$

The average current during a period can be expressed as follows:

$$I_{ave,in} = \frac{1}{T_{per}} \left( \int_0^{T_{positive}} \frac{I_{peak}}{T_{positive}} t \, dt + \int_0^{T_{negative}} \left( I_{peak} - \frac{I_{peak}}{T_{negative}} t \right) dt \right)$$

$$I_{ave,in} = \frac{1}{2} \frac{T_{ON}}{T_{per}} I_{peak} + \frac{1}{2} \frac{T_{freewheel}}{T_{per}} I_{peak}$$

$$= \frac{1}{2} \frac{1}{T_{per}} \left( \frac{I_{peak} L_1}{U_{in}} + \frac{I_{peak} L_1}{U_{out} - U_{in}} \right) I_{peak}$$

$$I_{ave,in} = \frac{1}{2} \frac{1}{T_{per}} \left( \frac{1}{U_{in}} + \frac{1}{U_{out} - U_{in}} \right) L_i I_{peak}^2$$

By letting the total period $T_{per}$ be dependent on $U_{in}$ and $U_{out}$ according to $$T_{per} = \frac{1}{k_0} \left( \frac{1}{U_{in}} + \frac{1}{U_{out} - U_{in}} \right), \tag{3}$$

the above expression for $I_{ave,in}$ is simplified to:

$$I_{ave,in} = \frac{1}{2} k_0 L_i I_{peak}^2.$$

In other words, by controlling the switching frequency in the oscillator 10 and obtaining a switching period equal to the above expression (3), the average current will be constant as long as the peak current $I_{peak}$ is held constant. This is the basic idea of the present invention. In the following part of this document, it will be described how such a period $T_{per}$ may be realized in an oscillating circuit.

The period $T_{per}$ is normally fixed by the charge and discharge time of a timing capacitor in the oscillator 10. By choosing $T_{charge}$ of this capacitor to be equal to $1/(k_0 * U_{in})$ and $T_{discharge}$ of the same capacitor to be equal to $1/(k_0 * (U_{out} - U_{in}))$, a total period of time $T_{per}$ can be achieved that is equal to the above expression.

One way of controlling the charge and discharge times consists in controlling the current led through the capacitor. A schematic circuit embodying this principle is given in FIG. 3.

By choosing a current source $I_{charge}$ that is dependent on the input voltage, the following expression of the charge time is obtained:

$$\begin{bmatrix} I_{charge} = \frac{U_{in}}{R_{T1}} \\ T_{charge} = \frac{\Delta U_C C_T}{I_{charge}} \end{bmatrix} \Rightarrow T_{charge} = \frac{\Delta U_C C_T R_{T1}}{U_{in}}, \tag{4}$$

where $R_{T1}$ is the charge resistance, $C_T$ is the capacitance of the timing capacitor, and $\Delta U_c$ is the voltage sweep across the capacitor (equal to $U_{threshold} - U_{trigger}$).

By choosing a current source $I_{discharge}$ that is dependent on the difference between $U_{out}$ and $U_{in}$, the discharge time obtained can be expressed as follows:

$$\begin{bmatrix} I_{discharge} = \frac{U_{out} - U_{in}}{R_{T2}} \\ T_{discharge} = \frac{\Delta U_C C_T}{I_{discharge}} \end{bmatrix} \Rightarrow T_{discharge} = \frac{\Delta U_C C_T R_{T2}}{U_{out} - U_{in}}, \tag{5}$$

where $R_{T2}$ is the discharge resistance.

If we combine $T_{charge}$ and $T_{discharge}$ we get:

$$\begin{bmatrix} T_{per} = T_{charge} + T_{discharge} = \frac{\Delta U_C C_T R_{T1}}{U_{out} - U_{in}} + \frac{\Delta U_C C_T R_{T2}}{U_{in}}, \\ R_{T1} = R_{T2} = R_T \end{bmatrix} \tag{6}$$

$$\Rightarrow T_{per} = \Delta U_C C_T R_T \left( \frac{1}{U_{out} - U_{in}} + \frac{1}{U_{in}} \right)$$

which corresponds to the desired function according to equation 3 above, with $1/k_0 = \Delta U_c C_T R_T$.

Figure 4:
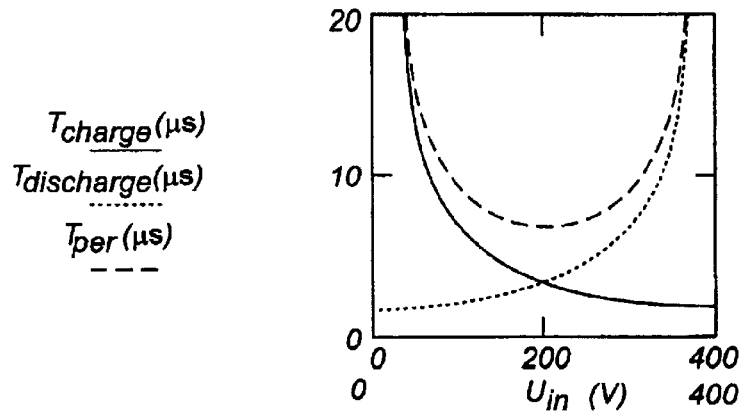
FIG. 4 shows a diagram of the charge and discharge times of the capacitor in FIG. 3.

FIG. 4 shows a graph of $T_{per}$, $T_{charge}$ and $T_{discharge}$, plotted versus the input voltage, $U_{in}$. The graphs were calculated using the following values for the parameters:

$C_t$=150 pF; $R_t$=1M8; $\Delta U_c$=2.5V; $U_{out}$=400V

Figure 3:
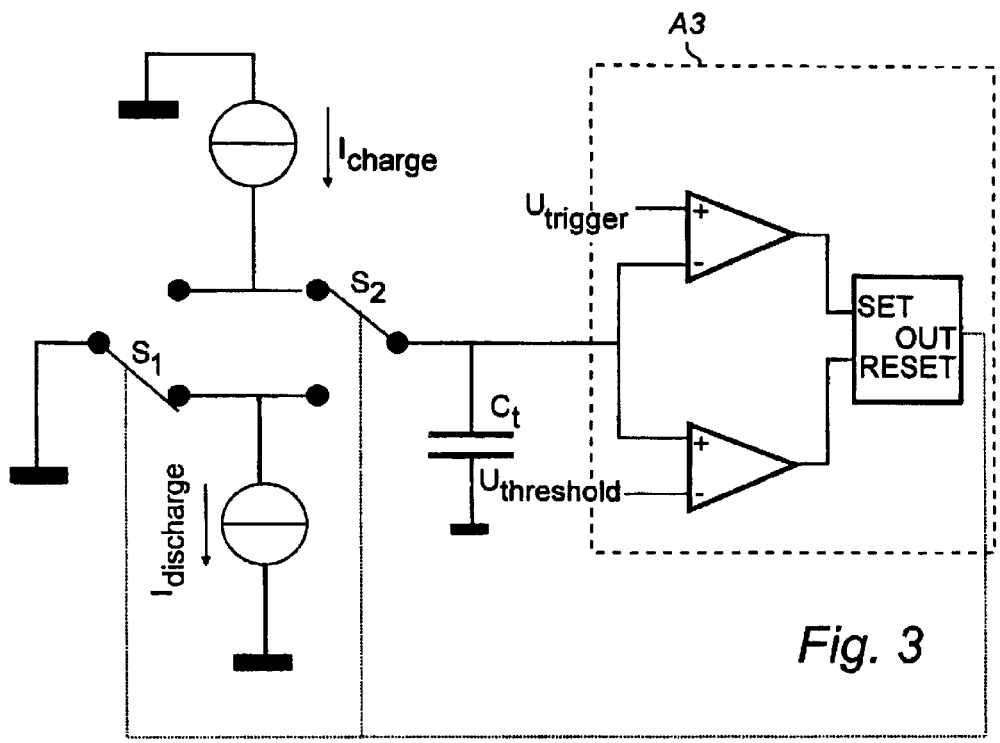
FIG. 3 shows a schematic view of the oscillator in FIG. 1.
Figure 5:
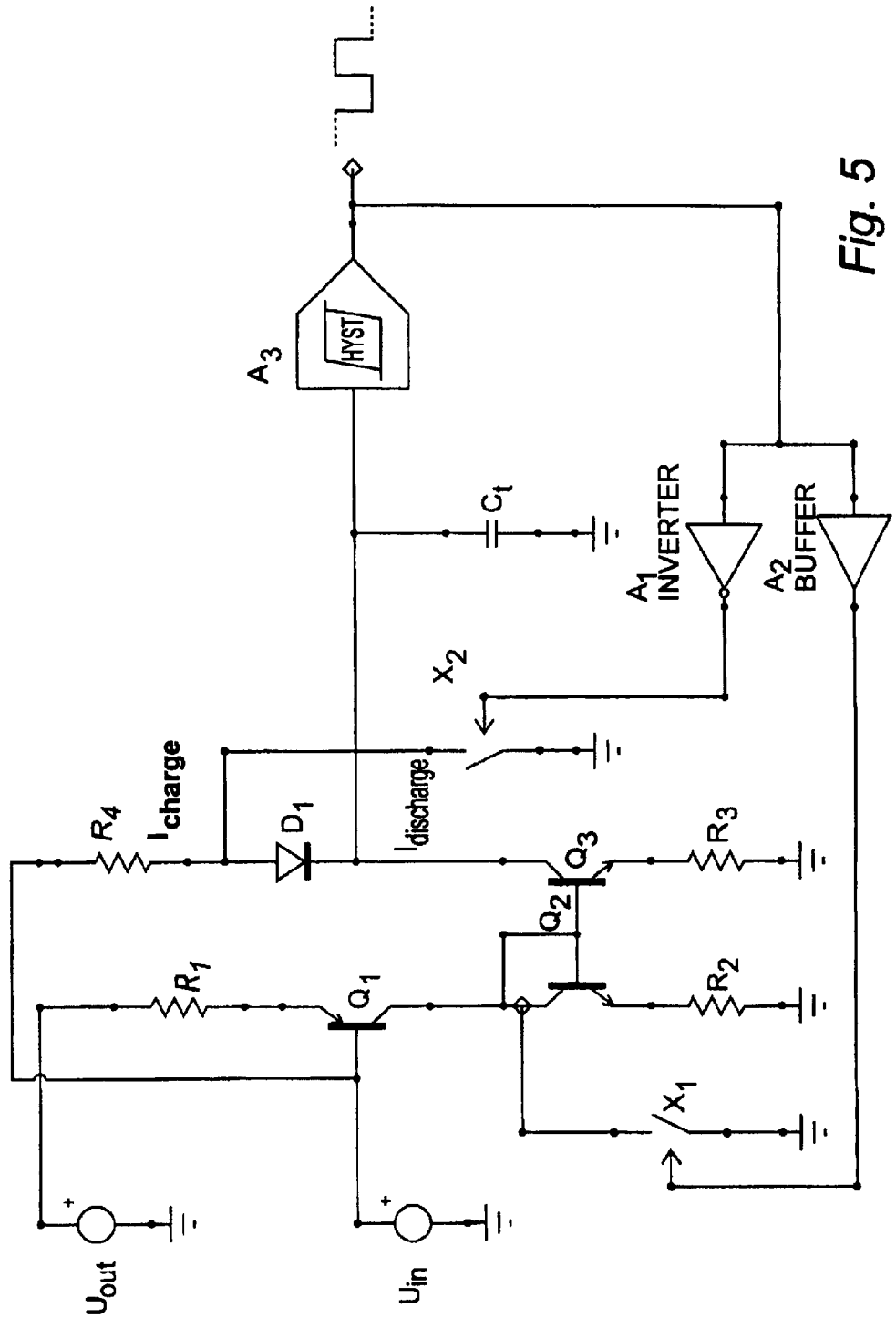
FIG. 5 shows an exemplary circuit layout of the oscillator in FIG. 1.

The schematic solution in FIG. 3 can be implemented in a circuit as illustrated in FIG. 5.

According to a second, more practical embodiment, the circuit in FIG. 5 is simplified to reduce cost and facilitate production. Such a circuit is shown in FIG. 6.

Figure 6:
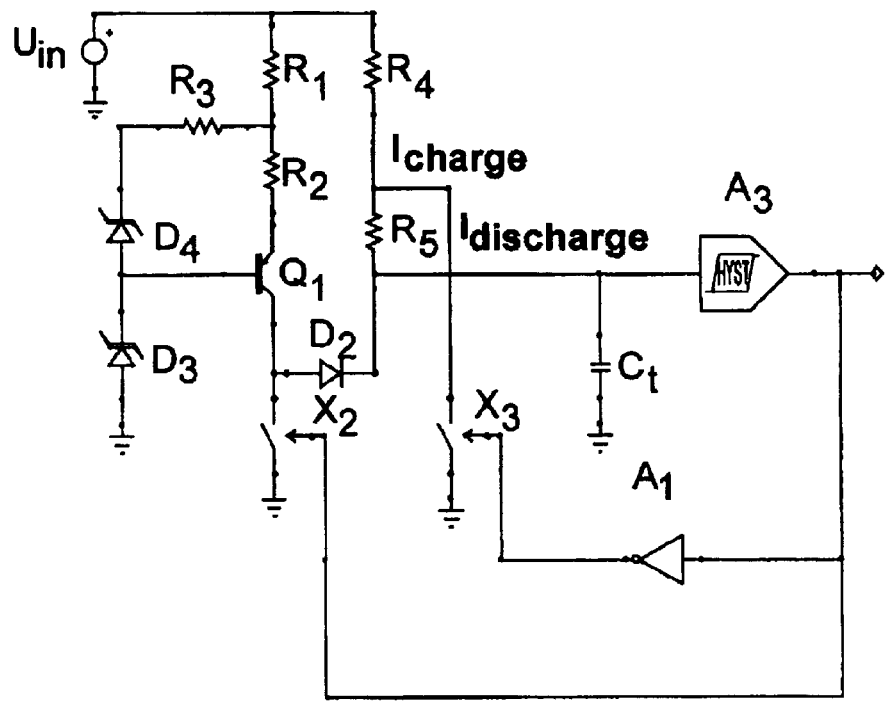
FIG. 6 shows a simplified circuit layout of the oscillator in FIG. 1.

In the circuit in FIG. 6, the output voltage $U_{out}$ is taken to be constant, which significantly simplifies the circuit.

The system block $A_3$ comprises two comparators and a latch which fulfills the following function

| Condition | Present output $A_3$ | New output $A_3$ |
|---|---|---|
| $U_{ct} > U_{threshold}$ | High | Low |
| $U_{ct} < U_{trigger}$ | Low | High |
| $U_{trigger} < U_{ct} < U_{threshold}$ | Low | Low |
| $U_{trigger} < U_{ct} < U_{threshold}$ | High | High |

When the output of $A_3$ is high (i.e. during the charge time), switch $X_3$ is open due to the inverter $A_1$ and the capacitor $C_t$ is connected to the input voltage via resistors $R_4$ and $R_5$. At the same time, switch $X_2$ is closed, and hence the current supplied by the collector of $Q_1$ is short-circuited to ground and has no influence on the charge time.

The charge current is determined by the difference between the input voltage $U_{in}$ and the voltage $U_{Ct}$ across the timing capacitor $C_t$, and by the resistors $R_4$ and $R_5$:

$$I_{charge} = \frac{U_{in} - U_{Ct}}{R_4 + R_5}. \tag{7}$$

This charge current results in a charge time $$T_{charge} = \frac{(R_4 + R_5)C_t}{U_{in} - U_{Ct}} = -(R_4 + R_5)C_t \ln\left(\frac{U_{Threshold} - U_{in}}{U_{Trigger} - U_{in}}\right). \tag{8}$$

As normally $U_{Ct}$ is much smaller then $U_{in}$, this expression is almost equal to the ideal case in equation (4).

When the output of $A_3$ is low (i.e. during the discharge time), switch $X_3$ is closed due to the inverter $A_1$, and consequently the capacitor $C_t$ is connected to ground via resistor $R_5$, causing discharging of the capacitor. At the same time, switch $X2$ is open.

If $Q_1$ were not present in the circuit, the discharge time $T_{discharge}$ would be constant over the full input voltage range:

$$I_{discharge} = \frac{U_{Ct}}{R_5} \tag{9}$$

$$T_{discharge} = -R_5 C_t \ln\left(\frac{U_{trigger}}{U_{Threshold}}\right) \tag{10}$$

By introducing transistor $Q_1$ into the circuit, this is no longer true, and the discharge current $I_{discharge}$ is divided in three regions approaching the discharge current function given in (5).

1. When the input voltage $U_{in}$ is not higher than the zener voltage $U_{z1}$ of diode $D_3$, the transistor $Q_1$ is not conducting and the charge time is constant according to equation (10) above.
2. When the input voltage $U_{in}$ is higher than the zener voltage $U_{z1}$ but not higher than $u_{limit}=(R_1+R_2)U_{z2}/R_2+U_{z1}$, (where $U_{z2}$ is the zener voltage of diode $D_4$), the discharge current is reduced to $$I_{discharge} = \frac{U_{Ct}}{R_5} - \frac{U_{in} - U_{z1}}{R_1 + R_2}, \tag{11}$$

resulting in a discharge time of:

$$T_{discharge} = -R_5 C_t \ln\left(\frac{U_{trigger} - \frac{U_{in} - U_{z1}}{R_1 + R_2}R_5}{U_{threshold} - \frac{U_{in} - U_{z1}}{R_1 + R_2}R_5}\right) \tag{12}$$

3. When the input voltage is higher that $u_{limit}=(R_1+R_2)U_{z2}/R_2+U_{z1}$, the discharge current is further reduced and becomes equal to $$I_{discharge} = \frac{U_{Ct}}{R_5} - \frac{\frac{U_{in} - U_{z1}}{R_1} + \frac{U_{z2}}{R_3}}{1 + \frac{R_2}{R_1} + \frac{R_2}{R_3}} \tag{13}$$

and the discharge time is equal to $$T_{discharge} = -R_5 C_t \ln\left(\frac{U_{trigger} - \frac{\frac{U_{in} - U_{z1}}{R_1} + \frac{U_{z2}}{R_3}}{1 + \frac{R_2}{R_1} + \frac{R_2}{R_3}}R_5}{U_{threshold} - \frac{\frac{U_{in} - U_{z1}}{R_1} + \frac{U_{z2}}{R_3}}{1 + \frac{R_2}{R_1} + \frac{R_2}{R_3}}R_5}\right) \tag{14}$$

Figure 7:
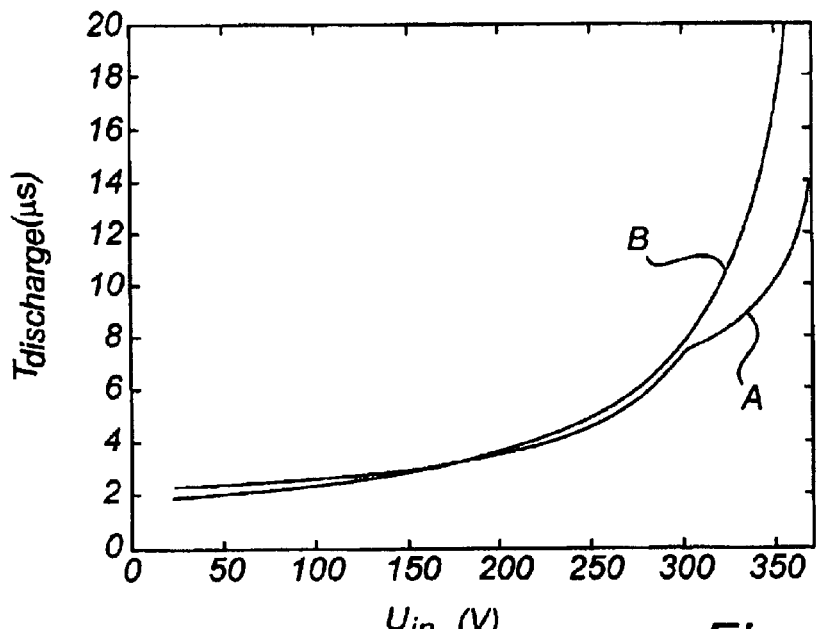
FIG. 7 shows a diagram of the discharge time of the capacitor in FIG. 6.

FIG. 7 shows the discharge time (curve A) as a function of the input voltage $U_{in}$ according to the circuit in FIG. 6. FIG. 7 also shows the theoretical function (curve B) according to equation 5 above, as shown in FIG. 4.

Figure 8:
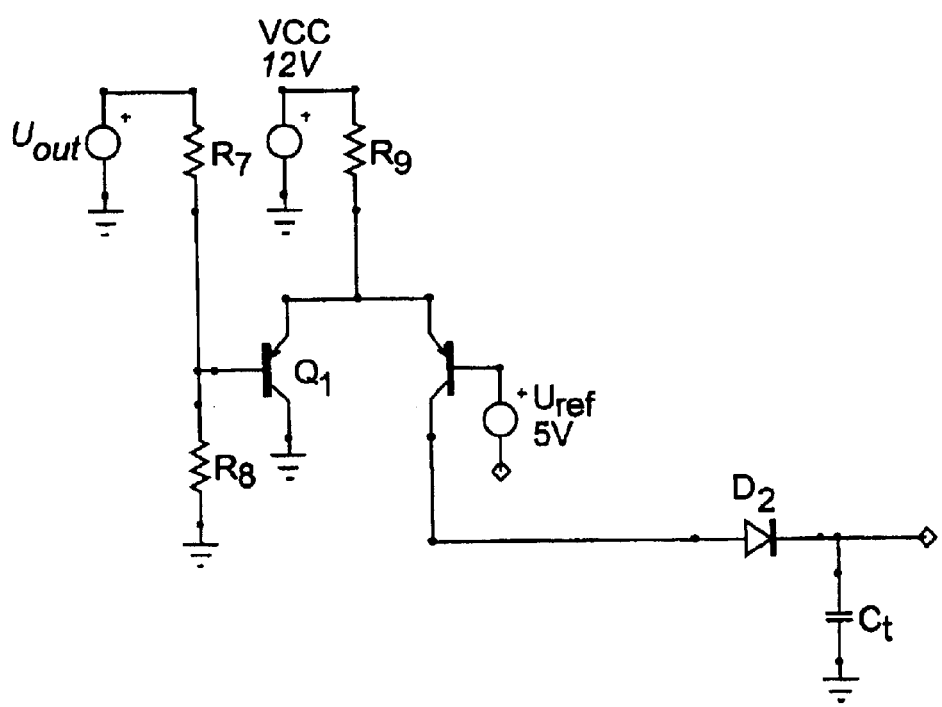
FIG. 8 shows an example of an overvoltage protection suitable for the preconditioner in FIG. 1.

In this way, also overvoltage protection (OVP) can be easily implemented by injecting a third discharge current which increases the discharge time. An example of this is illustrated in FIG. 8, where $U_{out}$ is the protected voltage.

It is noted that the above-described embodiments only are examples of embodiments of the current invention, which generally aims at improving the switching behavior in an oscillator for use in a peak current mode control of a voltage converter. A skilled person may naturally modify the circuit examples given above without departing from the scope of the claims.

What is claimed is:

1. An oscillator for use in a preconditioner receiving an input voltage and delivering an output voltage, comprising:
    a timing capacitor with a first terminal connected to ground, and a second terminal connected to a switching element via a discharge resistance, the switching element being arranged to connect flue discharge resistance to ground when an output signal of the oscillator is LOW, thereby causing discharge of the capacitor with a discharge current equal to $$I_{discharge} = \frac{U_{Ct}}{R_5},$$

where R5 is the discharge resistance and UCt is the voltage of the capacitor,
    a transistor with an emitter connected to the input voltage via a resistance, a diode with an anode connected to the collector of the transistor and a cathode connected to the second terminal of the timing capacitor, and a first zener diode with a cathode connected to the base of the transistor and an anode connected to ground, so that, when the input voltage exceeds a zener voltage of the zener diode, a current flows through the transistor, reducing the discharge current to $$I_{discharge} = \frac{U_{Ct}}{R_5} - \frac{U_{in} - U_{z1}}{R_1 + R_2},$$

where UIn is the input voltage, uz1 is the zener voltage, and R1+R2 is the resistance connecting the transistor to the input voltage.

2. The oscillator of claim 1, further comprising a second zener diode with a cathode connected to the input voltage via a second resistance and an anode connected to the cathode of the first zener diode and to the base of the transistor.

3. An oscillator of claim 1, further comprising a second switching element arranged to connect the collector of the transistor to ground when the output signal is HIGH.

4. A voltage converter including the oscillating circuit of claim 1, comprising a coil and a switching element, the converter being supplied with an input voltage from a rectifier and delivering an output voltage to a load, the switching element being controlled by a control unit working in peak current mode, wherein the control unit comprises the oscillating circuit.

* * * * *